United States Patent [19]
Morgan et al.

[11] Patent Number: 5,514,474
[45] Date of Patent: May 7, 1996

[54] CERAMIC COMPOSITES HAVING A WEAK BOND MATERIAL SELECTED FROM MONAZITES AND XENOTIMES

[75] Inventors: Peter E. D. Morgan; David B. Marshall, both of Thousand Oaks, Calif.

[73] Assignee: Rockwell International Corporation, Seal Beach, Calif.

[21] Appl. No.: 424,767

[22] Filed: Apr. 19, 1995

Related U.S. Application Data

[63] Continuation of Ser. No. 228,059, Apr. 15, 1994, abandoned.
[51] Int. Cl.$^6$ .................... B32B 9/04; B32B 19/00
[52] U.S. Cl. ............... 428/375; 428/378; 428/688; 428/699; 428/701; 428/704; 428/902; 501/126; 501/152
[58] Field of Search ................ 428/688, 699, 428/701, 702, 704, 328, 285, 426, 432, 446, 496, 902, 378, 375

[56] References Cited

U.S. PATENT DOCUMENTS

| | | | |
|---|---|---|---|
| 4,837,230 | 6/1989 | Chen | 501/88 |
| 4,888,311 | 12/1989 | Davidovits | 501/95 |
| 5,134,020 | 7/1992 | Cotteret | 428/212 |
| 5,137,852 | 8/1992 | Morgan | 501/95 |
| 5,190,820 | 3/1993 | Millard | 428/378 |
| 5,198,302 | 3/1993 | Chyung | 428/375 |
| 5,202,175 | 4/1993 | Paz-Pujalt | 428/142 |
| 5,221,578 | 6/1993 | Carpenter | 428/367 |
| 5,231,061 | 7/1993 | Devere | 501/95 |
| 5,262,235 | 11/1993 | Heaney | 428/373 |
| 5,275,984 | 1/1994 | Carpenter | 501/95 |
| 5,306,565 | 4/1994 | Grbin | 428/432 |

OTHER PUBLICATIONS

"Webster's II new Riverside University Dictionary", Horghton Mifflin Co. (1994), p. 733.
Hawley's Condensed Chemical Dictionary, 12th ed., Van Nostrand Reinhold Co., 1993, p. 240.

*Primary Examiner*—Ellis P. Robinson
*Assistant Examiner*—Leonidas J. Jones III
*Attorney, Agent, or Firm*—John C. McFarren

[57] ABSTRACT

Thermodynamically stable ceramic composites are provided for use in high temperature oxidizing environments. A phosphate selected from monazites and xenotimes functions as a weak bond interphase material between the constituents of the composites. Monazite comprises a family of minerals having the form $MPO_4$, where M is selected from the larger trivalent rare earth elements of the lanthanide series (La, Ce, Pr, Nd, Pm, Sm, Eu, Gd, and Tb) and coupled substituted divalents and tetravalents such as Ca or Sr with Zr or Th. Xenotimes are phosphates similar to monazite where M is selected from Sc, Y, and the smaller trivalent rare earth elements of the lanthanide series (Dy, Ho, Er, Tm, Yb, and Lu). High temperature ceramic composites that include monazite or xenotime and exhibit damage tolerant behavior or non-catastrophic fracture may be fabricated in a variety of material systems and reinforcement morphologies, including multilayered laminar composites; fiber, whisker, and particulate reinforced composites; and hybrid laminar composites. Alumina fibers may be used in single crystal or polycrystalline form as a reinforcement material. In preferred embodiments, the ceramic matrix comprises a material similar to the reinforcement to improve compatibility of the composite materials. The interphase material allows debonding and "frictional" sliding between the constituents of the composite and inhibits crack growth across the interface.

20 Claims, 2 Drawing Sheets

CERAMIC COMPOSITES HAVING A WEAK BOND MATERIAL SELECTED FROM MONAZITES AND XENOTIMES

GOVERNMENT RIGHTS

The United States Government has rights in this invention under contract number N00014-91-C-0157 awarded by the Department of the Navy.

This application is a continuation of application Ser. No. 228,059, filed Apr. 15, 1994, abandoned.

TECHNICAL FIELD

The present invention relates to ceramic composites and, in particular, to high temperature ceramic composites having a phosphate selected from monazites and xenotimes as a weak bond interphase material.

BACKGROUND OF THE INVENTION

A primary requirement for toughness in ceramic composites is the existence of a weak interface (or interphase) between constituents of the composite, such as between matrix and reinforcement materials. A weakly bonded interface allows sliding between the reinforcements and the matrix and/or preferential crack deflection around the reinforcements for optimal toughening of the composite. In fibrous composites the weak interface allows the matrix to crack and/or deform without rupturing the fibers. In particulate composites clouds of microcracks can form around a large crack and disperse the rupture process. In multilayered composites the individual layers can fracture independently and disperse the rupture event to produce a non-catastrophic response.

An ideal interface between a reinforcement and a ceramic matrix must be sufficiently weak to allow debonding and sliding of the reinforcement when a crack impinges upon it from the matrix. If this does not occur, the crack passes through the reinforcement with minimal or no toughening of the composite. A relevant property of the interface is the debond energy, $\Gamma_i$, of either the interphase material or the actual interfaces between the reinforcement, interphase material, and matrix. The debonding criterion is generally satisfied if $\Gamma_i/\Gamma_f<0.25$, where $\Gamma_f$ is the fracture energy of the reinforcement.

Ceramic composites are desirable in certain applications because of their refractory properties. For a high temperature composites, however, further requirements are imposed on the interphase material: it must be weak and stable over the entire temperature range of use, chemically compatible with the matrix and fiber, and morphologically and environmentally stable at high temperatures. Existing fibrous and multilayered ceramic composites rely on carbon, boron nitride, or micaceous materials (e.g., fluorophlogopite) to provide the weak interface. Examples of these composites include various glasses, glass ceramics, silicon carbide, and silicon nitride reinforced with SiC or $Al_2O_3$ fibers; alumina, silicon nitride, or $MoSi_2$ reinforced with SiC whiskers; and multilayered laminates having layers of SiC and carbon. At higher temperatures, however, carbon and boron nitride interphase materials oxidize readily and micaceous materials react with reinforcement and matrix materials.

Machinable glass ceramics are another example of ceramic composites that rely on easy debonding. These composites contain platelets of a mica, such as fluorophlogopite, that cleave easily and cause chipping when the surface is contacted by a hard point. Because of this easy chipping, the material can be shaped using conventional metal working processes such as milling, drilling, and turning that remove material at a single contact site (rather than the more expensive and less versatile multipoint grinding that is needed for most ceramics).

Composites containing layers of interface materials selected from the β-alumina/magnetoplumbite family of structurally related materials have been developed for use in high temperature, oxidizing environments. These materials are described in U.S. Pat. No. 5,137,852 issued to Morgan et al., the teachings of which are incorporated herein by reference. Experimental work with these materials has shown, however, that it is difficult to find suitable composite systems comprising a ceramic matrix; reinforcements having high strength and high Young's modulus; and a weakly bonded interface material that is morphologically stable in high temperature oxidizing environments, chemically compatible with the matrix and fiber system, and a good match to the thermal expansion of the matrix and fibers. Because most suitable reinforcements and matrices are multiphase materials, the compatibility of the materials is reduced, particularly over a range of temperatures, and the complexity of chemical processing is increased. Thus, there is a need for high temperature ceramic composites that are less complex, have a weakly bonded interface between reinforcement and matrix materials, and are morphologically stable in high temperature oxidizing environments.

SUMMARY OF THE INVENTION

The present invention comprises a family of ceramic composite materials that include a monazite or xenotime and are stable in oxidizing environments at temperatures up to about 2000° C. Monazite or xenotime functions as a weak bond interphase material between the constituents of the composite. Monazite comprises a family of phosphates having the form $MPO_4$, where M is selected from the larger trivalent rare earth elements of the lanthanide series (generally La, Ce, Pr, Nd, Pm, Sm, Eu, Gd, and Tb) and coupled substituted divalents and tetravalents such as Ca or Sr with Zr or Th. Xenotimes are phosphates similar to monazite, where M is selected from Sc, Y, and the smaller trivalent rare earth elements of the lanthanide series (generally Dy, Ho, Er, Tm, Yb, and Lu). High temperature ceramic composites that include a monazite or xenotime and exhibit damage tolerant behavior or non-catastrophic fracture (i.e., toughness) can be fabricated in a variety of material systems and reinforcement morphologies, including multilayered laminar composites; fiber, whisker, and particulate reinforced composites; and hybrid laminar composites. Alumina fibers ($Al_2O_3$), as an example of a preferred reinforcement material, have a high Young's modulus and may be used in single crystal or polycrystalline form. In preferred embodiments, the ceramic matrix comprises a material similar to the reinforcement to improve compatibility of the composite materials. The interphase material allows debonding and "frictional" sliding between the constituents of the composite and inhibits crack growth across the interface.

A principal object of the invention is improved toughness in ceramic composites. A feature of the invention is a monazite or xenotime included as a weak bond interphase material in ceramic composites. An advantage of the invention is formation of ceramic composites that are morphologically stable in high temperature oxidizing environments.

BRIEF DESCRIPTION OF THE DRAWINGS

For a more complete understanding of the present invention and for further advantages thereof, the following Detailed Description of the Preferred Embodiments makes reference to the accompanying Drawings, in which.

DETAILED DESCRIPTION OF THE PREFERRED EMBODIMENTS

Figure 1:
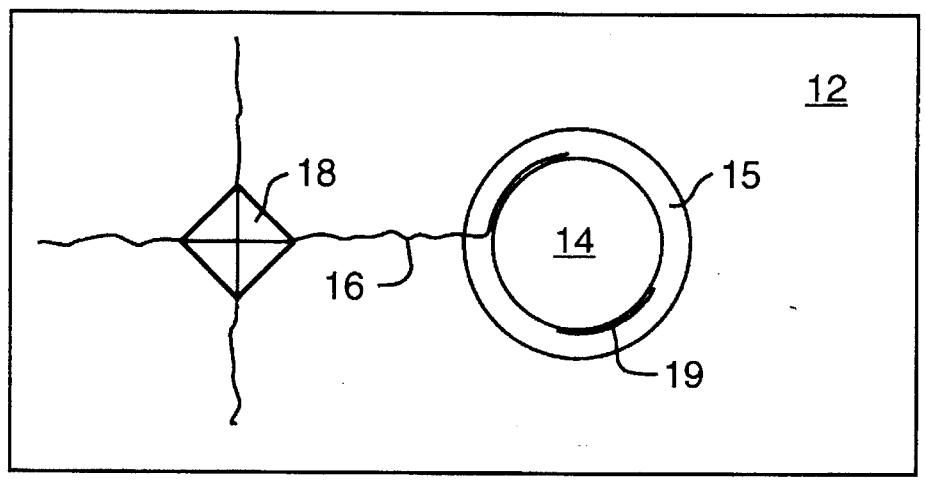
FIG. 1 is a schematic cross section showing crack deflection and debonding in a fiber reinforced ceramic composite of the present invention.

The present invention comprises a family of high temperature ceramic composites having an interphase material that provides a weakly bonded interface between the constituents of the ceramic composite. The interphase material, which is chosen for high temperature compatibility with the matrix and any reinforcement materials to provide a weakly bonded interface, is selected from the monazites and xenotimes. Monazite comprises a family of phosphates having the form $MPO_4$, where M is selected from the larger trivalent rare earth elements of the lanthanide series (generally La, Ce, Pr, Nd, Pm, Sm, Eu, Gd, and Tb) and coupled substituted divalents and tetravalents such as Ca or Sr with Zr or Th. Xenotimes are phosphates similar to monazite, where M is selected from Sc, Y, and the smaller trivalent rare earth elements of the lanthanide series (generally Dy, Ho, Er, Tm, Yb, and Lu). By way of example, the ceramic matrix material is generally selected from the group consisting of $Al_2O_3$, $MgAl_2O_4$, $ZrO_2$, monazites, xenotimes, mullite, and mixtures of the foregoing. The reinforcement material is generally selected from the group consisting of $Al_2O_3$, $MgAl_2O_4$, $ZrO_2$, mullite, and mixtures of the foregoing, and may be in the form of fibers, whiskers, or particulates. The interphase material allows "frictional" sliding between constituents of the ceramic composite and inhibits crack growth across the interface.

$LaPO_4$, or La-monazite, is a preferred interphase material in ceramic composites of the present invention because of its formation of a weak bond with alumina ($Al_2O_3$). Unfortunately, there are no known phase diagrams in the published literature involving monazite or xenotime and selected matrix materials. This omission indicates an oversight of the community regarding the unexpected and useful ceramic properties of these phosphates. For example, $LaPO_4$ is a refractory material with no decomposition up to its melting point of 2072+20° C. In addition, $LaPO_4$ is not easily reduced-it survives hot pressing in graphite to 1400° C. when not in direct contact with the solid graphite. The coefficient of thermal expansion (CTE) of monazite has been measured at $9.7 \times 10^{-6} \pm 0.1 \times 10^{-6}$ $C.^{-1}$ from room temperature to 1000° C. Monazite is non-toxic and insoluble in water and acids, which provides high temperature stability against stress corrosion in the humid atmosphere of combustion gases, for example.

The following descriptions and examples regarding $LaPO_4$ as a preferred interphase material also apply, in general, to the monazite and xenotime family of phosphates when used in ceramic matrix composites of the present invention. A preferred embodiment of the present invention comprises a ceramic composite system based on alumina ($Al_2O_3$) and $LaPO_4$ that is stable in high temperature oxidizing environments. The bond between $LaPO_4$ and alumina is sufficiently weak to allow debonding, and the materials are compatible and morphologically stable in oxidizing and reducing atmospheres at temperatures up to about 2000° C. Other potential interphase materials for alumina composites, such as C, BN, or refractory metals Mo, Cr, W, and Pt, are not oxidation resistant and can cause degradation of the fibers. Tin dioxide ($SnO_2$) can be used to provide a diffusion barrier and a weak interface between alumina fibers and glass or alumina matrices, but it is not stable in reducing atmospheres and it reacts slightly with various glasses.

EXAMPLES

Initial compatibility tests of preferred embodiments indicate that although no reactions and no eutectic occur between $Al_2O_3$ and $LaPO_4$ at temperatures up to about 1750° C., there is a small solid solubility of $Al_2O_3$ in $LaPO_4$ (barely discernible by x-ray diffraction). To ensure that this solid solution limit was exceeded, the $LaPO_4$ powder used to fabricate composites was pre-reacted with a small amount of alumina by firing at 1100° C. with the addition of 1% by weight of AlOOH (Disperal® solution).

1. Composite with Sapphire Fibers and $LaPO_4$ Interphase

Sapphire fibers were coated with $LaPO_4$ by dipping reinforcing fibers, such as sapphire fibers, for example, into a slurry of $LaPO_4$ powder in iso-butanol. The coated fibers were embedded in $\alpha$-$Al_2O_3$ powder and then placed in a graphite die and hot pressed at 1400° C. for 1 hour in a nitrogen atmosphere. Slices of the composite were cut and polished for testing. A schematic cross section of such a composite 10 is illustrated in FIG. 1, showing alumina matrix 12, reinforcing fiber 14, and $LaPO_4$ coating 15.

In the tests, both alumina matrix 12 and the $LaPO_4$ coating 15 were fully dense and no reactions between the $LaPO_4$ and matrix 12 or $LaPO_4$ and fibers 14 were observable by scanning electron microscopy. $LaPO_4$ coating 15 was continuous but not uniform—its thickness varied between approximately 1 µm and 20 µm, but the variation had no effect on the results. A Vickers indenter, a square based diamond pyramid used for testing hardness of materials (as gauged by the size of the square indentation area 18), was used to generate cracks 16 in ceramic composite 10 oriented normal to the surface and aligned along the diagonals of the contact area 18. Indentation cracks 16 generated by the Vickers indenter in $Al_2O_3$ matrix 12 always deflected at the interface of $LaPO_4$ coating 15 and fiber 14 as indicated in FIG. 1. Additional cracking occurred in $LaPO_4$ coating 15 in the region where the indentation crack impinged on the coating. Interfacial debonding 19 also occurred on the opposite side of fiber 14. Debonding 19 was isolated from the indentation crack 16 and was caused by the tensile residual stress field of the indentation.

The debonding and sliding characteristics of the interface coating 15 were tested by using a flat ended indenter to push on the end of fiber 14 in a thin slice (1 mm thickness) of composite 10 in which fiber 14 was oriented normal to the slice. This caused debonding of the entire interface followed by sliding of fiber 14 out of the hole. Examination of the newly exposed surfaces of pushed fiber 14 and the remaining hole by scanning electron microscopy indicated that the separation occurred exactly along the interface between $LaPO_4$ coating 15 and sapphire fiber 14. This test indicates that the $Al_2O_3$, $LaPO_4$, and sapphire composite system possesses the debonding and sliding characteristics needed for a tough composite.

Slices of composite 10 containing fibers 14 normal to the surface were polished then heated in air to various temperatures for various times to test the stability of the interface coating 15. After heating, the interfacial debonding was tested using the indentation cracking method described above. In all cases (the most severe being 1600° C. for 24 hours) the interfaces debonded when the indentation crack intersected them. After long heat treatments at temperatures up to 1400° C., there was no evidence of any reaction or change in interfacial morphology internally (except for some grain growth in the monazite to a grain size of ~5 to 10 μm) or on the exposed surface. After heat treatment at 1600° C. there were no changes internally (i.e., examination of surface after polishing off ~10 μm of the exposed surface). However, on the exposed surface there were plate-shaped β-alumina/magnetoplumbite grains formed at the interfaces between the alumina and the monazite (more so between the matrix and monazite than between the monazite and the fibers). These grains were a Mg-Ca-La-aluminate, which was apparently stabilized by Mg that originated from the matrix (the alumina powder used for the matrix contained 0.5% MgO as an additive to control grain growth). Such plate-shaped grains were not observed when a high purity alumina was used.

2. Composite with $LaPO_4$ Matrix and Sapphire Fiber Reinforcement

In a variation of the composite described above, sapphire fibers 14 were placed in a graphite die with $LaPO_4$ powder and hot pressed at 1300° C. for 1 hour in a nitrogen atmosphere. This produced a composite similar to that of FIG. 1, except that $LaPO_4$ formed the entire matrix instead of merely a coating around fibers 14. Sections of the composite were cut normal to the fiber direction using a diamond saw and polished with diamond powder to allow microstructural characterization and testing of fracture properties.

The $LaPO_4$ matrix was close to fully dense and no reaction with sapphire fibers 14 was observable by scanning electron microscopy. Several tests were done to assess the interfacial debond properties, including loading a Vickers indenter into the matrix near a fiber 14 as shown in FIG. 1. As described above, when a crack 16 intersected a sapphire fiber 14, crack 16 was deflected around the fiber-matrix interface, similar to that illustrated in FIG. 1, rather than passing into and through fiber 14.

Another test involved flexural loading of a thin slice of composite 10, containing fibers 14 oriented normal to the slice, until the slice fractured. Where the fracture intersected fibers 14 it deflected around the interface leaving clean separation of the fibers and matrix. These results show that the interface between $LaPO_4$ and sapphire has sufficiently low fracture energy for use in tough ceramic composites.

3. Multilayered Alumina and $LaPO_4$ Laminar Composite

Laminar composites of the present invention were fabricated using two colloidal methods. In both cases separate slurries of alumina (Sumitomo powder without Mg additive) and $LaPO_4$ powders were prepared as follows: the powders were dispersed ultrasonically in water at pH 2 and $NH_4NO_3$ was added to 2M resulting in suspensions that coagulated and allowed particles to pack to high density. In one method the multilayered composite was formed by alternately adding measured amounts of the two suspensions to a cylindrical container and centrifuging the container between each addition. This formed uniform, alternating, densely packed layers of the two powders which, after drying, were sintered to full density by heating in air at 1600° C. for 2 hours. Specimens with various layer thicknesses (as small as approximately 2 μm) were prepared in this manner. In a second method, multilayered composites were formed by alternately vacuum slip casting measured amounts of the two suspensions to form a layered compact which was then surrounded by alumina powder and hot pressed in graphite dies at 1400° C. for one hour.

Figure 2:
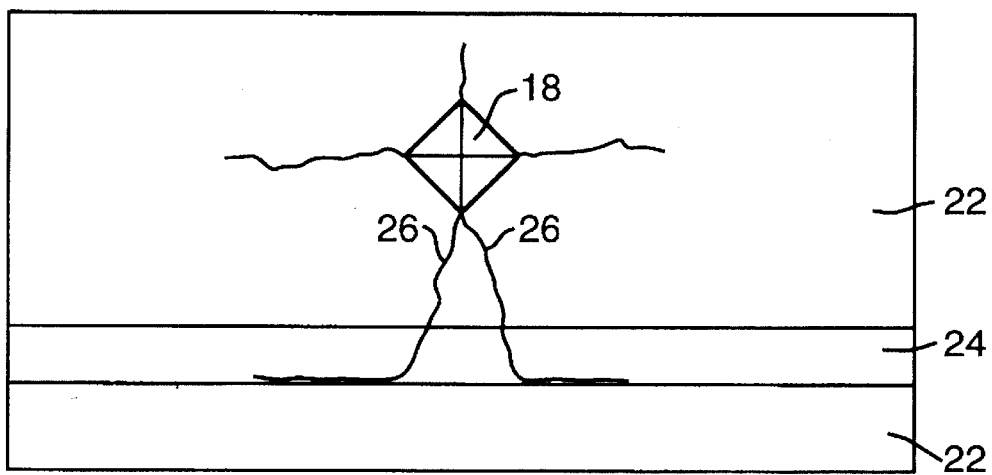
FIG. 2 is a schematic cross section showing crack deflection and debonding in layers of a ceramic composite of the present invention.

Interfacial debonding was tested on specimens with thick (>100 μm) $Al_2O_3$ layers 22 and thin (~2 to 20 μm) $LaPO_4$ layers 24 using Vickers indentations 18 placed near a thin layer 24 as shown in FIG. 2. Cracks 26 from indentation 18 were arrested by $LaPO_4$ layer 24, which debonded along the interface with the next layer of $Al_2O_3$.

Figure 3:
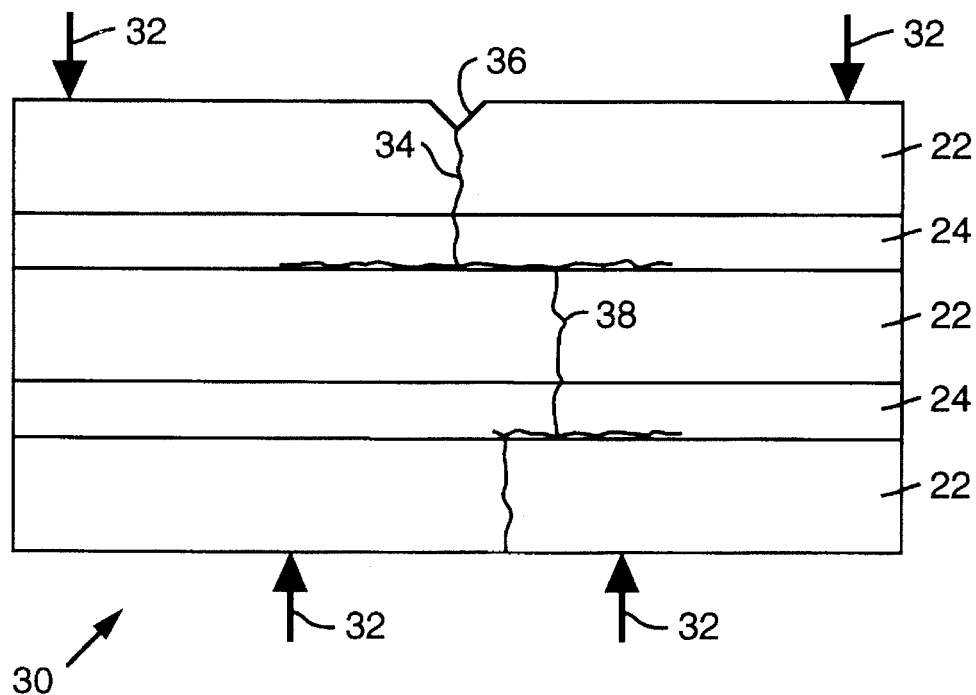
FIG. 3 is a schematic cross section showing crack propagation through multiple layers of a laminar ceramic composite of the present invention.

Interfacial debonding of a multilayer laminar composite 30 was tested by loading notched beams as indicated by arrows 32 in FIG. 3. Crack 34 that initiated from notch 36 in top $Al_2O_3$ layer 22 was arrested at the first $LaPO_4$ layer 24, which then debonded along the interface with the next $Al_2O_3$ layer 22. After increasing the applied load, a new crack 38 initiated independently in the next $Al_2O_3$ layer 22 and the sequence of crack growth, debonding, and new initiation repeated throughout the specimen as illustrated in FIG. 3.

Slices of composite 30 with polished surfaces were heat treated as in Example 1 above to test the stability of the $LaPO_4$ layers 24 and interfaces. The only changes detected after heat treatment at temperatures up to 1600° C. and times up to 24 hours were grain growth in both the alumina (grain size up to 50 μm) and monazite (grain size up to 20 μm). There were no signs of adverse reactions or changes in interface morphology (without Mg in the matrix, the β alumina grains did not form on the exposed surface at 1600° C. as they did in Example 1 above).

4. Hybrid Laminar and Fibrous Composites

Figure 4:
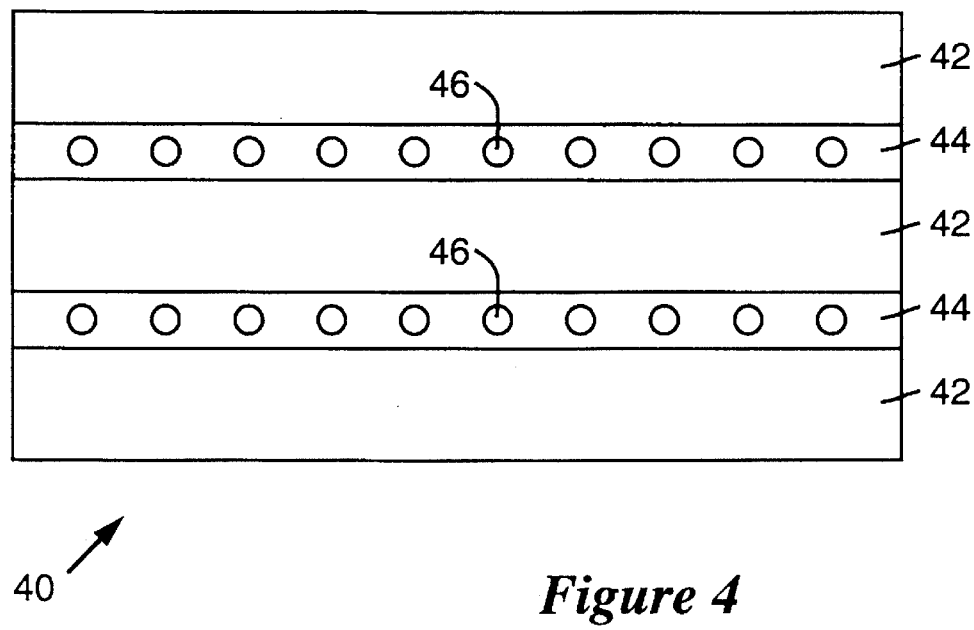
FIG. 4 is a schematic cross section showing a hybrid laminar ceramic composite of the present invention.

Hybrid laminar composites 40 consisting of polycrystalline alumina layers 42 alternating with $LaPO_4$ layers 44 reinforced with sapphire fibers 46, as shown in FIG. 4, were fabricated using the colloidal method described above in Example 3. $LaPO_4$ layers 44 were built in several steps using a vacuum slip casting method as follows: a thin layer 44 of $LaPO_4$ was deposited on top of a previous $Al_2O_3$ layer 42, fibers 46 were laid in place, and the remainder of $LaPO_4$ layer 44 was added. These steps were simply repeated to build up multilayer hybrid composite structure 40. The same tests as in Example 3 above were used to assess interfacial debonding, with similar results being obtained. In the notched beam tests an additional effect of debonding and pullout of the sapphire fibers within the $LaPO_4$ was observed. Such fiber pullout is expected to improve the toughness of laminar composites.

5. Particulate Composites

Particulate composites of the present invention were fabricated of $LaPO_4$ and $Al_2O_3$ using the following colloidal method: powder slurries of $Al_2O_3$ and $LaPO_4$ were prepared as described above in Example 3, then measured amounts of the two slurries were mixed together using ultrasonic agitation to achieve uniform mixing. Mixtures containing ratios 1:3, 1:1, and 3:1 of $Al_2O_3$:$LaPO_4$ by volume were prepared. Testing indicated that these particulate composites are machinable, and the $Al_2O_3$:$LaPO_4$ ratio can be optimized for specific end use applications.

Although the present invention has been described with respect to specific embodiments thereof, various changes, modifications, and substitutions may be suggested to one skilled in the art. Therefore, it is intended that the present invention encompass such changes and modifications as fall within the scope of the appended claims.

We claim:

1. A ceramic composite having high temperature stability, comprising:
    a first ceramic material selected from the group consisting of monazites and xenotimes;
    a second ceramic material combined with said first ceramic material to form the ceramic composite;
    one of said first and second ceramic materials forming a ceramic matrix with the other of said ceramic materials embedded in said ceramic matrix; and
    a weak bond interface between said first and second ceramic materials in the ceramic composite.

2. The ceramic composite of claim 1, wherein said ceramic composite comprises a tough ceramic composite.

3. The ceramic composite of claim 1, wherein said second ceramic material is selected from the group consisting of $Al_2O_3$, $MgAl_2O_4$, $ZrO_2$, mullite, glasses, glass ceramics, silicon carbide, silicon nitride, $MoSi_2$, and mixtures of the foregoing.

4. The ceramic composite of claim 1, wherein said first ceramic material forms said ceramic matrix and said second ceramic material is embedded in said matrix of said first ceramic material.

5. The ceramic composite of claim 4, wherein said second ceramic material comprises a reinforcement material selected from the group consisting of $Al_2O_3$, $MgAl_2O_4$, $ZrO_2$, SiC, mullite, sapphire, and mixtures of the foregoing.

6. The ceramic composite of claim 5, wherein said reinforcement material has a form selected from the forms consisting of fibers, whiskers, and particulates.

7. The ceramic composite of claim 1, wherein said first and second ceramic materials are combined to form a machinable ceramic composite.

8. The ceramic composite of claim 1, wherein one of said first and second ceramic materials comprises a particulate material combined in said ceramic matrix to form a machinable ceramic composite.

9. A layered ceramic composite having high temperature stability, comprising:
    at least one layer of a first ceramic material selected from the group consisting of monazites and xenotimes;
    at least two layers of a second ceramic material combined with said first ceramic material such that said first and second Ceramic materials form alternating layers in the layered ceramic composite; and
    a weak bond interface between said first and second ceramic materials in the layered ceramic composite.

10. The layered ceramic composite of claim 9, wherein said ceramic composite comprises a tough ceramic composite.

11. The layered ceramic composite of claim 9, wherein said second ceramic material is selected from the group consisting of $Al_2O_3$, $MgAl_2O_4$, $ZrO_2$, monazites, xenotimes, mullite, glasses, glass ceramics, silicon carbide, silicon nitride, $MoSi_2$, and mixtures of the foregoing.

12. The layered ceramic composite of claim 9, further comprising a reinforcement material combined with said first and second ceramic materials to form a hybrid layered ceramic composite.

13. The layered ceramic composite of claim 12, wherein said reinforcement material is embedded in a matrix of said first ceramic material comprising a layer of said hybrid layered composite.

14. The layered ceramic composite of claim 13, wherein said reinforcement material has a form selected from the forms consisting of fibers, whiskers, and particulates, and wherein said first ceramic material forms a weak bond interface with said reinforcement material embedded in said matrix of said first ceramic material.

15. The layered ceramic composite of claim 14, wherein said reinforcement material is selected from the group consisting of $Al_2O_3$, $MgAl_2O_4$, $ZrO_2$, SiC, mullite, sapphire, and mixtures of the foregoing.

16. A ceramic composite, having high temperature stability, comprising:
    a first ceramic material selected from the group consisting of monazites and xenotimes;
    a second ceramic material combined with said first ceramic material;
    a third ceramic material forming a ceramic matrix embedding said first and second ceramic materials to form the ceramic composite; and
    said first ceramic material forming a weak bond interphase between said second and third ceramic materials in the ceramic composite.

17. The ceramic composite of claim 16, wherein said ceramic composite comprises a tough ceramic composite.

18. The ceramic composite of claim 16, wherein said second and third ceramic materials are selected from the group consisting of $Al_2O_3$, $MgAl_2O_4$, $ZrO_2$, monazites xenotimes, mullite, glasses, glass ceramics, silicon carbide, silicon nitride, $MoSi_2$, sapphire, and mixtures of the foregoing.

19. The ceramic composite of claim 16, wherein said second ceramic material comprises a reinforcement material, said first ceramic material comprises a coating on said reinforcement material, and said coated reinforcement material is embedded in said third ceramic material that forms said ceramic matrix.

20. The ceramic composite of claim 19, wherein said reinforcement material has a form selected from the forms consisting of fibers, whiskers, and particulates.

* * * * *